UNITED STATES PATENT OFFICE.

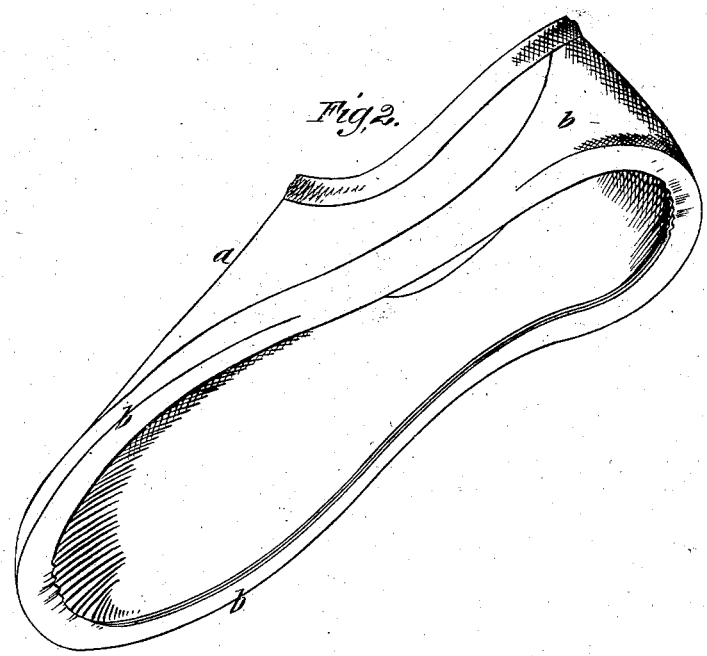
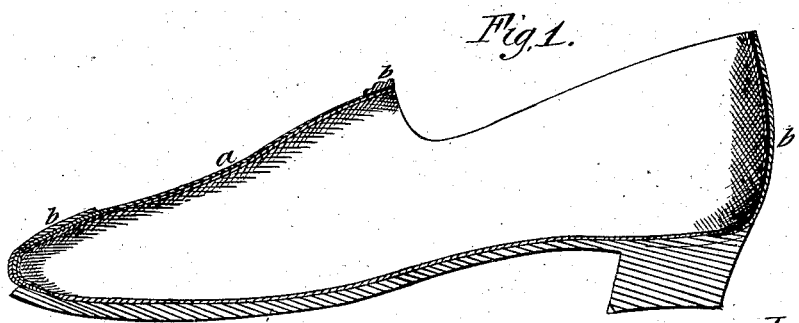

CHRISTOPHER MEYER, OF NEW BRUNSWICK, NEW JERSEY.

BOOT AND SHOE.

Specification of Letters Patent No. 32,575, dated June 18, 1861.

*To all whom it may concern:*

Be it known that I, CHRISTOPHER MEYER, of New Brunswick, in the county of Middlesex and State of New Jersey, have invented an improvement in boots and shoes and in the manufacture of the same, whereby a new article of merchandise is produced and prepared for market; and I do hereby declare that the following is a full, clear, and exact description of the same, reference being had to the accompanying drawings, forming part of this specification.

My invention relates to those boots and shoes which are manufactured with "uppers" made of cloth, felt, linen, or other fabric, pervious to moisture and coated in part with india rubber and having a sole of leather or other equivalent substance. Shoes with "uppers" of a like construction have previously been made, but, with rubber soles, one kind of which will be found described in my patent of March 19, 1861, but such shoes are not as pleasant for wearing as those having soles of the ordinary leather. I propose to construct them, so that while they are proof against water to a sufficient degree, they will permit the perspiration of the foot to pass off through the "upper", and be also provided with soles like the ordinary boot or shoe.

In the accompanying drawings, Figure 1 represents a section of the finished shoe and Fig. 2, the "upper" prepared and ready to be used in the manufacture of the same.

*a*, in each, represents the uncoated portion of the fabric of which the "upper" is composed, and *b*, the part which is coated with rubber as hereinafter described.

*c*, is the sole composed of leather or other suitable material other than rubber.

To enable others to make and use my invention, I will proceed to describe its construction and operation.

I provide the "upper" of a boot or shoe with a foxing of rubber, and also when desirable with a binding of the same material, which is done by passing the fabric together with a thin sheet of plastic rubber between rollers, heated to the proper degree, having raised surfaces thereon of proper patterns, by which means the rubber is made to adhere and is pressed inseparably into the fabric in the parts desired; or, the fabric and sheet of rubber may be passed between plain rollers with a loose pattern of proper shape and thickness; or, the same effect may be produced by pressure between flat surfaces with a suitable raised pattern beneath the fabric. A preparatory coating for the "upper" is thus applied upon those parts which are to be covered with rubber. The "upper" having thus been prepared is put upon a last and formed into the shape desired for use, in the construction of a boot or shoe. The portions which have received the preparatory coating aforesaid, are now covered with pieces of the corresponding shape, which are cut from sheet rubber, prepared for vulcanization, and the whole is then vulcanized in the usual manner. The "uppers" thus prepared, may be packed up in any desired quantities, and sent to any distance to be made up into boots or shoes. The rubber binding may be entirely omitted, or one of any other material substituted. When it is desired to manufacture these "uppers" into boots or shoes, any shoemaker can attach the soles in any of the usual methods, treating the upper as though it were leather; though I prefer the use of pegs of wood or metal for that purpose. The shoe or boot, when thus made, will have all the good qualities of the rubber shoe or boot, and be exempt from all its objectionable properties.

What I claim as my invention and desire to secure by Letters Patent, is—

1. A shoe, of which the upper is made of cloth, or other fabric permeable to moisture, coated with rubber in the manner above described, in such parts as may be desirable, and having its sole made of sole leather or some substance other than india rubber or gutta-percha.

2. An "upper" prepared as above described, to be used for the purposes above set forth.

C. MEYER.

Witnesses:
Jos. FORD,
O. B. GASTON.